United States Patent Office

3,506,469
Patented Apr. 14, 1970

3,506,469
PARTICULATE INK SYSTEMS
Witold Titow, Surrey, England, assignor to Molins
Machine Company Limited, London, England
No Drawing. Filed Sept. 11, 1967, Ser. No. 666,985
Claims priority, application Great Britain, Sept. 13, 1966,
40,795/66
Int. Cl. B44d 1/094; B41m 1/22
U.S. Cl. 117—21                                         6 Claims

ABSTRACT OF THE DISCLOSURE

A particulate ink system comprises two components, an epoxy resin and a curing agent therefor, one or both components also containing colourant. The printing process in which the ink is used comprises an ink transfer step followed by a print fixing step, and the two components of the ink are maintained separate until said fixing step. The transfer of the two components may be effected simultaneously or sequentially, and either or both components may contain finely divided fillers.

---

This invention is concerned with particulate inks as used in electrostatic printing, magnetic printing, certain copying processes and dry powder printing; in certain applications such particulate inks are sometimes referred to as "toners." These printing processes have in common that they comprise an ink transfer step in which a particulate ink is applied to the substrate to be printed and a subsequent print fixing step.

The particulate inks used in such processes normally comprise a resin binder and one or more colourants, i.e. dyes or pigments. They may also contain one or more finely divided fillers and are in the form of particles having an average size of from 5 to 30 microns, although for some ink transfer processes it is preferred to use particulate inks having an average size of from 5 to 15 microns. In many cases it is preferred that the particles should be spherical.

We have now developed an improved particulate ink system which is based on the use of epoxy resin as the principal resin binder.

According to the present invention, we provide a particulate ink system for use in a printing process as described above, which comprises two components, the first being a particular epoxy resin and the second comprising a curing agent for the epoxy resin, one or both of said components containing one or more colourants. The invention further provides a printing process which comprises an ink transfer step in which solid particulate ink is applied to a substrate and a print fixing step in which the particulate ink is fused to form the desired image, which process is characterised in that the particulate ink system according to the invention is used.

The particulate components of the ink system suitably have a particle size of from 5 to 30 microns and are preferably substantially spherical. One or both of the components may, if desired, contain one or more finely divided fillers.

The two component ink system can be used in a number of ways. Firstly, both components in particulate form can be mixed and the mixture of particles can be used in the same way as any other particulate ink.

Secondly, the ink transfer process can be modified so as to provide for separate and sequential application of the two components, both in a particulate state, to the substrate to be printed.

Thirdly, the second component (comprising the curing agent) can be pre-coated on the substrate to be printed and the first, epoxy resin component alone applied subsequently by the ink transfer process. In this case the colourant(s) should, of course, be present only in the epoxy resin component. The second component may be coated onto the substrate from a solution or suspension in a suitable liquid medium and the coated substrate then dried. If desired, the second component may be sintered or fused to the substrate after the latter has been dried in order to improve its adherence to the substrate. Alternatively, the second component can be applied in dry particulate form over the whole area of the substrate and then sintered or fused to the substrate.

Fourthly, the first epoxy resin component alone can be applied to the substrate to be printed in the image areas by the ink transfer process and the second component applied subsequently over the whole area of the substrate (suitably by any of the methods described above). In this case also, the colourant(s) should be present only in the epoxy resin component.

The first component is, as mentioned above, an epoxy resin. Such resins are widely known and commercially available under trade names such as "Epikote" (Shell Chemical Company).

The second component comprises a curing agent for the epoxy resin, this curing agent preferably being dispersed in a resinous carrier. This second component should be compatible with the epoxy resin component in the molten state in order to ensure good mixing of the two components during the print fixing step of the printing process. Both components should, of course, be so chosen that they fuse and become molten at the temperature reached in the print fixing step of the process in which they are to be used and yet should not be so low melting and/or prone to cold flow as to cause agglomeration in storage or impair the flow of the powders they constitute. In practice this generally means that these components should have melting points in the range 70° to 180° C. (although materials having melting points outside this range are also operable). Epoxy resins and suitable resinous carriers and epoxy resin curing agents having melting points within this range are commercially available.

Many curing agents for epoxy resins are known and any curing agent which is effective at the temperature reached in the print fixing step or at a lower temperature can be used. Suitable curing agents are, for example, dicyandiamide, tetrahydrophthalic anhydride, p-toluidine fluoroborate and triethylenetetramine. It is preferred to use a curing agent which is activated on heating to an elevated temperature and continues to effect curing and/or cross-linking when the temperature is reduced from that at which it was activated.

When the curing agent is itself a compound which fulfills the requirements of a satisfactory ink component— e.g. as to storage stability, melting point, good powder flow (for the ink systems in which both components are powders), compatibility in the fused state with the fused epoxy resin and capability of being produced in the desired physical state, and acceptably low toxicity and dermaticity—it may be used on its own as the second component. For example, tetrahydrophthalic anhydride which is an epoxy resin curing agent, has a melting point of 100° C. and can be satisfactorily spray dried—although when so dried crystalline rather than spherical particles are produced. Other curing agents may be coated onto the substrates by themselves, as in the third or fourth printing procedures described.

It is, however, preferred that the curing agent should be dispersed in a resinous carrier to form the second component. A preferred class of suitable resinous carriers are low-melting polyamides since such polyamides have good compatibility with the epoxy resins and with a large number of epoxy resin curing agents, have substantially the same density as epoxy resins, have low melt viscosities and are good film formers. Because of this combination of properties they mix rapidly and uniformly with the epoxy resin in the print fixing step when the two components are fused together. Another advantage of this is that the resin-encased curing agent cannot come into contact with the epoxy resin and thus cause premature curing (particularly in the case of the two-powder mixture system) and further, that the dangers of toxic and dermatitic curing agents are reduced by virtue of their encasement in the carrier.

A preferred class of polyamides for the present purpose are polymeric fatty acid amides, such as those available under the trademark "Versamid" (Cornelius Chemicals Ltd.).

The amount of curing agent present in the carrier is determined largely by three main considerations:

(1) Enough curing agent must be present in the carrier to ensure adequate curing of the epoxy resin. An excess over the theoretical amount is generally desirable.

(2) In order to achieve good contact between the curing agent and the epoxy resin on fusion the resinous carrier (in which the curing agent is dispersed) must be present in quantities sufficiently large to ensure good mixing of the two components on fusion. On the other hand, it is preferable to keep the amount of carrier in the final print to a minimum as the general aim is to have a print containing as much cured epoxy resin as possible (preferably at least 50%). In practice, a compromise is struck between the two requirements. A typical upper limit for the epoxy resin component would be between 60 and 80% by weight.

(3) The maximum amount of curing agent which can be incorporated into the carrier is governed by (a) compatibility of the curing agent and the carrier, (b) the desirable limits to any resulting modification of the physical properties (in particular, surface properties) of the carrier and (c) limitations of the incorporation technique—for example, when it is desired to use spray drying for preparing the second component in particulate form there is frequently a limit on the amount of curing agent which may be incorporated into the carrier and if attempts are made to spray dry curing agent/carrier mixtures containing more than the critical amount of curing agent, the particles produced may be non-spherical and may also possess other undesirable properties. We have found, for example, that the maximum proportions of five particular curing agents which can be successfully spray dried in a laboratory-type atomiser using "Versamid 940" as the carrier are as follows:

| Curing agent: | Maximum proportion of curing agent (parts per hundred of resin) |
|---|---|
| B.I.B.–3 [1] | 25. |
| Dicyandiamide | Pure dicyandiamide. |
| Tetrahydrophthalic anhydride | Pure tetrahydrophthalic anhydride. |
| Triethylenetetramine | 40. |
| p-Toluidine fluoborate | 15. |

[1] B.I.B.–3 is an adduct of "Epikure 828" (trademark—Shell Chemical Company) and $HBF_4$, of the type described in British patent specification No. 923,078.

The actual amount of curing agent necessary to effect curing of the resin will, of course, depend on the nature of the epoxy resin and the curing agent employed, the only requirement being that/or sufficient curing agent should be supplied to cure and cross-link the whole or substantially the whole of the epoxy resin. Certain curing agents such as dicyandiamide and "B.I.B.–3" act catalytically and such curing agents need only be used in relatively small amounts. When curing agents of this type are incorporated into a resinous carrier they may be present in amounts as low as 0.05% by weight of the resin or even lower. Naturally, the lower the amount of curing agent in the resin, the more of the second component will have to be used. Other curing agents react with the epoxy resin to effect curing and these must be used in larger proportions. The colourants and fillers used in our two component ink system can be any of those customarily used in particulate inks and they can be used in the customary proportions; the particulate components can be made by any of the processes available for subdividing synthetic plastics materials, such as milling or spray drying.

The particulate epoxy resin may be treated with an anti-agglomerating agent e.g. silica powder to prevent the particles adhering to each other whilst in storage. If the second component is also in particulate form it too may be treated in like manner.

The advantage provided by our two component system is that the inherent advantages of epoxy resins as the resin binder for the print areas formed by the processes in question, that is their strength and toughness, the fact that they are thermoset, and their excellent adhesion to a wide variety of substrate materials, are obtained without the disadvantages that would arise if the curing agent were present with the epoxy resin. Since the curing agent is physically separated from the epoxy resin there is no danger of premature curing of the latter, for example, during spray-drying in the production of the particulate epoxy resin, and the shelf-life of the ink system, even when the two components are mixed together is very extended largely due to the fact that in our preferred system the curing agent is encased by the resinous carrier.

In order that the invention may be more fully understood the following examples are given by way of illustration only:

EXAMPLE 1

137.5 g. of solid epoxy resin (Epikote 1001) were dissolved in 1237.5 g. of a 1:1 toluene/isopropanol mixture at room temperature. Methanol was added to the solution with stirring until the first signs of cloudiness appeared when the addition was stopped. 55 g. of submicron sized titanium dioxide (a filler) and 19.2 g. of E.B. Spirit Black (a dye) (Williams of Hounslow) were then dispersed in the solution with vigorous agitation. The solution/dispersion as then spray-dried in a laboratory spray dryer ("Niro" Mobile Minor—trademark—Niro Atomizer A.S.) the air inlet temperature being less than 100° C. and the outlet temperature bing 50–59° C.

The powder formed was very black and consisted of spherical particles, the majority of which had a diameter of about 5 microns, while a minor proportion had diameters of up to 20 microns. The powder was made free flowing by adding 1% by weight of silica powder ("Aerosil"—trademark—Bush, Beach & Gent Ltd.) and sieving through a 200 B.S. mesh screen (having openings of 74 microns).

A low melting polyamide (Versamid 940) and B.I.B.–3 (the $HBF_4$/Epikure 828 epoxy resin curing agent referred to previously) were dissolved in a 1:1 toluene/isopropanol mixture at room temperature to give a solution containing 10% by weight of polyamide and 0.5% of B.I.B.–3, based on the weight of polyamide. Methanol was added to the solution with stirring until the first signs of cloudiness appeared when the addition was stopped. Sub-micron sized titanium dioxide and E.B. Spirit Black (as filler and colourant dye respectively) were then dispersed in the solution with vigorous agitation, the amount of titanium dioxide being 40% based on the weight of the polyamide and the amount of E.B. Spirit Black being 14% on the same basis. The solution/dispersion was then spray-dried, using an air inlet temperature of 115°–125° C. and an outlet temperature of 75° C.–85° C.

The particles of the powder obtained were spherical and had an average particle size of 4–8 microns. The powder was rendered free flowing by addition of 1%

"Aerosil" powder and sieving although a 200 B.S. mesh screen.

Equal amounts by weight of the epoxy resin and polyamide powders were thoroughly mixed together, a thin layer of the powder was applied to a paper substrate and the coated substrate was positioned 2 cm. below a 250 watt infra-red lamp to simulate the print fixing step of a dry powder printing process. It was found that fusion took place in less than 1 second and that curing began in about 1 minute; a tough fully cured "print" was ultimately obtained.

EXAMPLE 2

A Versamid 940 powder was prepared as described in Example 1 except that the curing agent used was dicyandiamide and that this was introduced into the solution/dispersion for spray drying as a solution in a 1:1 acetone/water mixture which was used instead of methanol as the precipitant; the concentration of dicyandiamide in the acetone/water and the amount of the latter used was such that 24% of dicyandiamide, based on the weight of the Versamid, was added.

The precipitant liquid was added to the solution of Versamid with vigorous stirring again until the first signs of precipitation appeared. Prior to addition of the precipitant liquid, a few drops of a non-ionic surfactant (Lissapol N—trademark—I.C.I. Ltd.) were added to the polyamide solution. The composition of the solution/dispersion immediately prior to spray-drying was as follows:

|  | G. |
|---|---|
| Versamid 940 | 25 |
| 1:1 toluene/isopropanol | 225 |
| Titanium dioxide | 10 |
| E.B. Spirit Black | 3.5 |
| Dicyandiamide | 6 |
| 1:1 acetone/water | 125 |

+ a few drops of Lissapol N.

The solution/dispersion was spray-dried as described in Example 1 to give a free-flowing powder having an average particle size of 8–10 microns.

When this polyamide powder was mixed (1:1 by weight) with the epoxy resin powder of Example 1 and subjected to the simulated print fixing treatment, fusion took place in less than 1 second and curing began in about 2 minutes to give ultimately a tough, fully cured "print."

EXAMPLE 3

A dicyandiamide-containing Versamid powder was produced as in Example 2, but omitting the titanium dioxide and using a solution of dicyandiamide in 120 g. of 1:1 acetone/water precipitant liquid, such as to provide 40% of dicyandiamide based on the weight of the Versamid.

The Versamid powder obtained on spray-drying had an average particle size of about 10 microns and was free flowing.

When this Versamid powder was mixed (1:1 by weight) with the epoxy resin powder of Example 1 and subjected to the simulted print fixing treatment, fusion took place in less than 1 second and curing began in about 2 minutes to give ultimately a tough, fully cured "print."

EXAMPLE 4

A Versamid 940 powder was prepared as described in Example 3 except that the dicyandiamide was replaced by tetrahydrophthalic anhydride ("Epikure" RXE11—Shell Chemical Company), this curing agent being added in solution in acetone alone with constant stirring to give 40% of curing agent based on the weight of the Versamid. Further acetone was then added with stirring until the first signs of precipitation appeared.

The solution/dispersion was then spray-dried as in Example 1 to give a powder having an average particle size of 10–15 microns. The powder was treated with 1% "Aerosil" powder and sieved as described in Example 1 to render it free flowing.

When this Versamid powder was mixed (1:1 by weight) with epoxy resin powder of Example 1 and subjected to the simulated print fixing treatment, fusion took place in less than 1 second and curing began in about 1 minute to give ultimately a tough, fully cured print.

EXAMPLE 5

A Versamid 940 powder was prepared as described in Example 1 except that the B.I.B.–3 curing agent was replaced by p-toluidine fluoroborate in an amount giving 4% of curing agent based on the weight of Versamid.

The powder obtained on spray-drying had an average particle size of 7–10 microns and was treated with 1% "Aerosil" powder and sieved to render it free-flowing.

When this Versamid powder was mixed (1:1 by weight) with the epoxy resin powder of Example 1 and subjected to the simulated print fixing treatment, fusion took place in less than 1 second.

EXAMPLE 6

A Versamid 940 powder was prepared as described in Example 1 except that the B.I.B.–3 curing agent was replaced by triethyltetramine in an amount giving 20% of curing agent based on the weight of Versamid.

The powder obtained on spray-drying had an average particle size of 10–15 microns and was treated with 1% "Aerosil" powder and sieved to render it free flowing.

When this Versamid powder was mixed (1:1 by weight) with the epoxy resin powder of Example 1 and subjected to the simulated print fixing treatment, fusion took place in less than 1 second and curing began in less than 1 minute to give ultimately a tough, fully cured "print."

What I claim as my invention and desire to secure by Letters Patent is:

1. In a printing process which comprises applying a solid particulate ink to an area on a surface of a substrate which defines an image and fusing said ink to fix the image to said substrate, the improvement comprising,
    (a) using as said solid particulate ink a system comprising (1) particles of an epoxy resin and (2) particles of a low melting point polyamide having encased therein a curing agent for said epoxy resin, and
    (b) fusing by heating said ink to a temperature sufficient to melt the polyamide and bring the curing agent into contact with the epoxy resin to thereby cure said epoxy resin and fix the image to said substrate.

2. A process in accordance with claim 1 wherein said solid particulate ink is formed prior to applying it to said area by admixing said particles of epoxy resin with said particles of a low melting point polyamide having encased therein a curing agent for said epoxy resin.

3. A process in accordance with claim 1 wherein said solid particulate ink is formed by sequentially and separately applying the particles of epoxy resin and the particles of a low melting point polyamide having encased therein a curing agent for said epoxy resin to said area.

4. A process in accordance with claim 1 wherein the particles of said ink have a size of from 5 to 30 microns and are substantially spherical.

5. A process in accordance with claim 1 wherein said system also includes a finely divided filler, an anti-agglomerating agent and a colorant.

6. A process in accordance with claim 1 wherein said polyamide is a polymeric fatty acid amide.

(References on following page)

References Cited

UNITED STATES PATENTS

| | | | |
|---|---|---|---|
| 2,735,785 | 2/1956 | Greig | 117—17.5 |
| 2,987,102 | 6/1961 | Heinrichs | 117—21 |
| 2,995,482 | 8/1961 | Boyce et al. | 117—21 |
| 2,997,776 | 8/1961 | Matter et al. | 117—21 |
| 3,041,195 | 6/1962 | Saewert et al. | 117—62.2 |
| 3,090,696 | 5/1963 | Gemmer | 117—21 |
| 3,102,043 | 8/1963 | Winthrop et al. | 117—21 |
| 3,102,823 | 9/1963 | Manasia et al. | 117—21 |
| 3,135,720 | 6/1964 | Batzer et al. | 117—62.2 |
| 3,140,174 | 7/1964 | Clark | 117—17.5 |
| 3,215,527 | 11/1965 | Johnson | 117—17.5 |
| 3,242,131 | 3/1966 | Peerman | 117—21 |
| 3,322,537 | 5/1967 | Giaimo | 117—17.5 |
| 3,326,680 | 6/1967 | Garrett | 117—17.5 |
| 3,377,286 | 4/1968 | Stricklin | 117—17.5 |

WILLIAM D. MARTIN, Primary Examiner

R. M. SPEER, Assistant Examiner

U.S. Cl. X.R.

252—62.1